United States Patent [19]

Wood

[11] 4,087,195
[45] May 2, 1978

[54] TAPPING ACCESSORY

[76] Inventor: James R. Wood, 3225 Central Ave., Columbus, Ind. 47201

[21] Appl. No.: 774,898

[22] Filed: Mar. 7, 1977

[51] Int. Cl.² .................. B25B 13/10; B25B 13/44
[52] U.S. Cl. .................................. 408/240; 279/42
[58] Field of Search ............... 408/238, 239, 240; 279/1 L, 42, 48, 49, 56

[56] References Cited

U.S. PATENT DOCUMENTS

| 2,607,055 | 8/1952 | Starkel | 408/239 X |
| 3,738,768 | 6/1973 | Kuhn | 408/240 |

Primary Examiner—Travis S. McGehee
Attorney, Agent, or Firm—Cohn, Powell & Hind

[57] ABSTRACT

A tapping accessory for use with the chuck of a rotary-operated machine such as a drill press or lathe in which a tap tool is detachably secured to one end of a body, and a first guide element is on the other end of the body. A second guide element is telescopically related and rotatively mounted to the first guide element on a longitudinal axis and is adapted to be gripped in the chuck of the rotary-operated machine. A handle is detachably secured to the body between the tap-connecting assembly and the guide elements for turning the body and tap tool manually about the axis of the guide elements. More particularly, the first and second guide elements are at the same side of the handle, while the tap-connecting assembly is at the opposite side of the handle. In one embodiment, the first guide element is a socket in the said other end of the body, while the second guide element is a spindle slidably and rotatively received in the socket. The handle is located in a transverse bore at the bottom of the socket, the spindle engaging the handle to determine the retracted position of the spindle in the socket. More particularly, in the one embodiment, the handle extends through either of a pair of transverse bores so that when located in one transverse bore located between the socket and the tap-connecting assembly, the device is adapted for turning the tap tool about the axis of the spindle and socket, and when located in the other transverse bore located through the socket adjacent the said other body end, the device is adapted for use as a manual tap wrench.

3 Claims, 9 Drawing Figures

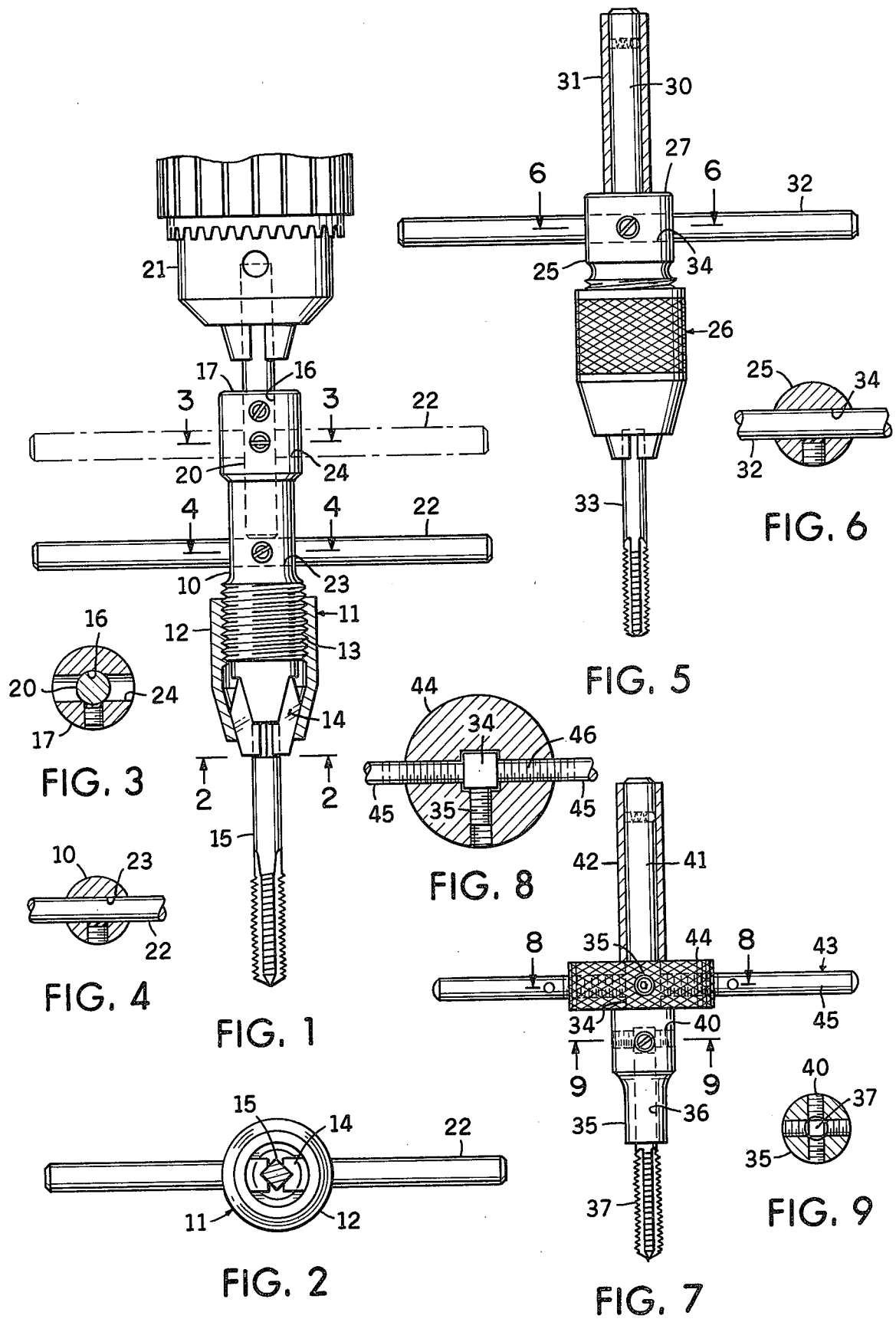

TAPPING ACCESSORY

BACKGROUND OF THE INVENTION

This invention relates generally to improvements in a tapping device, and more particularly to an improved device that can be used with the chuck of a rotary-operated machine such as a drill press, lathe or milling machine.

The heretofore conventional types of tapping accessory allegedly adapted for use with drill presses, lathes and milling machines, were not practical because of their excessive length. It is of extreme importance that a tapper is no longer, and preferably shorter, than the drill that has been momentarily removed from the chuck because it is not desirable to readjust the position of the workpiece.

SUMMARY OF THE INVENTION

The present tapping accessory is especially adapted for use with the chuck of a rotary-operated machine such as a drill press, lathe or milling machine. Because of its particular structural arrangement, the overall length of the tapping accessory is much shorter than the heretofore conventional tapping accessories discussed previously. The short tapping accessory is of the optimum length so that it can be utilized with the chuck of the rotary-operated machine upon removal of the drill bit without requiring any readjustment of the workpiece.

This tapping accessory includes a tap tool that is detachably secured to a tap-connecting means on one end of a body, and a guide means that includes a first guide element on the other end of the body, and a second guide element telescopically related and rotatively mounted to the first guide element on a longitudinal axis, and adapted to be gripped in the chuck of a rotary-operated machine. A handle is detachably secured to the body between the tap-connecting means and the guide means for turning the body and tap tool manually about the axis of the guide elements.

In one embodiment of the invention, the first guide element is a socket formed in the said other end of the body, and the second guide element is a spindle slidably and rotatively received in the socket. In another embodiment, the first guide element is a post secured to the said one end of the body, and the second element is a sleeve slidably and rotatively received in the post.

In the present tapping accessory, the first guide element is on the said other end of the body at one side of the handle, and the second guide element is mounted to the first guide element at the same side of the handle, and the tap-connecting means is on the said one end of the body at the opposite side of the handle.

In one embodiment, the body is provided with a transverse bore at the bottom of the socket formed in the said other end of the body, and the handle slidably extends through the transverse bore and projects laterally outward from opposite sides of the body. The spindle engages the handle to determine the retracted position of the spindle in the socket.

More particularly, the body is provided with a pair of transverse bores, one of the transverse bores being located between the socket and the tap-connecting means, and the other transverse bore being located through the socket adjacent the said other end of the body. When the handle is located in one transverse bore, the device is adapted for turning the tap tool about the axis of the spindle and socket, and when the handle is located in the said other transverse bore, the device is adapted for use as a manual tap wrench.

BRIEF DESCRIPTION OF THE DRAWINGS

FIG. 1 is a side elevational view of the tapping accessory, partly in cross section, and illustrating an alternate position of the handle in phantom lines;

FIG. 2 is a cross sectional view taken on line 2—2 of FIG. 1;

FIG. 3 is a cross sectional view taken on line 3—3 of FIG. 1;

FIG. 4 is a cross sectional view taken on line 4—4 of FIG. 1;

FIG. 5 is a side elevational view, partly in cross section of a modification of the tapping accessory;

FIG. 6 is a cross sectional view taken on line 6—6 of FIG. 5;

FIG. 7 is a side elevational view of a modification of the tapping accessory, shown partly in cross section;

FIG. 8 is a cross sectional view taken on line 8—8 of FIG. 7, and

FIG. 9 is a cross sectional view taken on line 9—9 of FIG. 7.

DESCRIPTION OF THE PREFERRED EMBODIMENTS

Referring now by characters of reference to the drawing, and first to the tapping accessory illustrated in FIGS. 1–4, it will be understood that the tapping accessory includes a cylindrical body 10. A chuck generally indicated by 11 and constituting a tap-connecting means, is provided on one end 13 of the body 10. The chuck 11 includes an internally threaded sleeve 12 threadedly attached to the lower externally threaded body end 13. As is usual, the chuck 11 includes a plurality of jaws 14 carried internally of the sleeve 12 and adapted to move together in a clamping action upon threaded movement of the sleeve 12.

A conventional tap tool 15 is detachably secured to the tap-connecting means, and more particularly is held selectively by the jaws 14 of the chuck 11.

A guide means includes an open-end socket 16, constituting a first guide element, formed in the body end 17. A spindle 20 constituting a second guide element, is telescopically related and rotatively mounted in the socket 16 on a longitudinal axis, the spindle 20 being selectively gripped in the chuck 21 of a rotary-operated machine such as a drill press, lathe or milling machine.

Detachably secured to the body 10 between the chuck 11 and the guide means 16–20, is a handle 22 for turning the body 10 and tap tool 15 manually about the axis of the guide elements 16 and 20. The handle 22 is an elongate rod that extends through a transverse bore 23 formed in the body 10 at the bottom of the socket 16, the handle 22 projecting laterally outward from opposite sides of the body 10. The spindle 20 engages the handle 22 in the transverse bore 23 to determine the retracted position of the spindle 20 in the socket 16.

It will be understood that the socket 16 constituting the first guiding element is on the body end 17 at one side of the handle, and that the spindle 20 constituting the second guide element is mounted to the socket 16 at the same side of the handle. The chuck 11 constituting the tap-connecting means is on the body end 13 at the opposite side of the handle 22.

The body 10 is provided with a second transverse bore 24 extending through the socket 16 and adjacent the body end 17. The handle 22, as illustrated in phantom lines in FIG. 1, can be selectively extended through the second transverse bore 24 when the spindle 20 is removed from the socket 16. The handle 22 in this position projects laterally outward from opposite sides of the body 10 and adapts the tapping accessory for use as a manual tap wrench.

After a hole is drilled in a workpiece, the drill bit is removed from the chuck 21 and the spindle 20 of the tapping accessory is placed in the chuck 21. The handle 22 is located and fixed in the transverse bore 23 of the body 10, and the spindle 20 is in its fully retracted position in its socket 16 as determined by abutment with the handle 22 at the bottom of the socket 16. Then, the handle 22 can be turned manually to turn the tap tool 15 for tapping operation in the drill hole. As the tap is formed, the body 10 and the tap tool 15 will rotate and will move longitudinally as the spindle is extended relatively out of its socket 16.

Instead of using the chuck 21, the tapping accessory can be utilized as a manual tap wrench by removing the spindle 20 and inserting the handle 22 into the second transverse bore 24 at the body end 17.

In the embodiment of FIG. 5, the tapping accessory includes a cylindrical body 25 on which is mounted a chuck 26 identical to the chuck 11 of FIG. 1. The other body end 27 is provided with an integral post 30 constituting the first guide element of the guide means. A sleeve 31 constituting the second guide element of the guide means is telescopically related and rotatively mounted on the post 30 on a longitudinal axis. The sleeve 31 is adapted to be gripped in the chuck 21 of the rotary-operated machine in the same manner as spindle 20 of the embodiment of FIG. 1.

A handle 32 is detachably connected to the body 25 between the chuck 26 and the guide elements 30-31 for turning the body 25 and its associated tap tool 33 manually about the axis of the guide elements 30-31. More particularly, the body 25 is provided with a transverse bore 34 through which the handle 32 extends, the handle 32 being a rod that projects laterally outward from opposite sides of the body 25.

Again, it will be understood that the post 30 constituting the first guiding element is on the body end 27 at one side of the handle 32, and that the sleeve 31 constituting the second guide element is mounted to the post 30 at the same side of the handle 32, while the chuck 26 constituting the tap-connecting means is on the other end of the body 25 at the opposite side of the handle 32.

In usage, the sleeve 31 is secured in the chuck 21 of the rotary-operated machine with the post 30 retracted fully within the sleeve 31 as determined by the abutment of the sleeve 31 with the body end 27. As the handle 32 is manually turned to rotate the tap tool 33 and form the tap, the body 25 will move longitudinally as the post 30 is relatively extended axially out of the sleeve 31.

In the embodiment of FIG. 7, the tapping accessory includes a body 34 with a tap-connecting means 35 at one end of the body 34. The tap-connecting means 35 includes a socket 36 that receives the shank of the tap tool 37. A plurality of set screws 40 selectively secure the shank of the tap tool 37 in the socket 36.

Similar to the embodiment of FIG. 5, this tapping accessory includes an integral post 41 constituting a first guide element at the other end of the body 34. A sleeve 42 constituting the second guide element is telescopically related and rotatively mounted to the post 41 on a longitudinal axis. The sleeve 42 is adapted to be gripped in the chuck 21 of the rotary-operated machine.

A handle means 43 is detachably secured to the body 34 between the tap connecting means 35 and the guide elements 41-42 for turning the body 34 and the associated tap tool 37 manually about the axis of the guide elements 41-42. More particularly, the handle means 43 includes a knurled wheel 44 located about and receiving the body 34, and secured to the body 34 by a set screw 35'. The knurled wheel 44 can be used directly for turning the body 34 and the associated tap tool 37 during manual operation. However, to facilitate the operation, a pair of handle rods 45 are secured to opposite sides of the wheel 44. The threaded ends 46 of the handle rods 45 can engage the flat sides of the body 34 to provide a more effective attachment of the handle means 43 to the body 34.

To use this embodiment of the tapping accessory, the sleeve 42 is placed and secured in the chuck 21 of the rotary-operated machine with the post 41 in its fully retracted position in the sleeve 42 as determined by abutment of the sleeve 42 with the top of body 34 and wheel 44. As the body 34 and the tap tool 37 are turned by the handle means 43 to form the tap, the post 41 will move toward a relatively extended position from the sleeve 42.

Again, it will be understood that the post 41 constituting the first guide element is at one end of the body 34 at one side of the handle means 43, and the sleeve 42 constituting the second guide element is mounted to the post 41 at the same side of the handle means 43, while the tap-connecting means 35 is on the other end of the body 34 at the opposite side of the handle means 43.

I claim as my invention:

1. A tapping accessory for use with the chuck of a rotary-operated machine, comprising:
   (a) a body,
   (b) a tap-connecting means on one end of the body,
   (c) a tap tool detachably secured to the tap-connecting means,
   (d) guide means including:
      (1) a first guide element on the other end of the body, and
      (2) a second guide element telescopically related and operatively mounted to the first guide element on a longitudinal axis, and adapted to be gripped in the chuck of the rotary-operated machine,
   (e) a handle detachably secured to the body between the tap-connecting means and the guide means for turning the body and tap tool manually about the axis of the guide elements,
   (f) the first guide element being a post secured to the said one end of the body, and
   (g) the second element being a sleeve slidably and rotatively receiving the post.

2. A tapping accessory for use with the chuck of a rotary-operated machine, comprising:
   (a) a body,
   (b) a tap-connecting means on one end of the body,
   (c) a tap tool detachably secured to the tap-connecting means,
   (d) guide means including:
      (1) a first guide element on the other end of the body, and
      (2) a second guide element telescopically related and operatively mounted to the first guide element on a longitudinal axis, and adapted to be gripped in the chuck of the rotary-operated machine,
(e) a handle detachably secured to the body between the tap-connecting means and the guide means for turning the body and tap tool manually about the axis of the guide elements,
(f) the first guide element being a socket in the said other end of the body,
(g) the second guide element being a spindle slidably and rotatively received in the socket,
(h) the body being provided with a transverse bore at the bottom of and communicating with the socket, and
(i) the handle slidably extending through the bore and projecting laterally from opposite sides of the body, and the spindle engaging the handle in the socket to determine the relatively retracted position of the spindle in the socket.

3. A tapping accessory as defined in claim 1, in which:
(j) the body is provided with a second transverse bore extending through the socket adjacent the said other end of the body on the opposite side of the said first transverse bore from the tap-connecting means, and
(k) the handle selectively extends through the secod transverse bore when the spindle is removed from the socket, and projects laterally outward from opposite sides of the body for use as a manual tap wrench.

* * * * *